Sept. 26, 1950     O. J. ALVAREZ ET AL     2,523,261
CLOSURE ARRANGEMENT FOR FLUID HEATING DEVICES
Filed Nov. 6, 1947     2 Sheets-Sheet 1
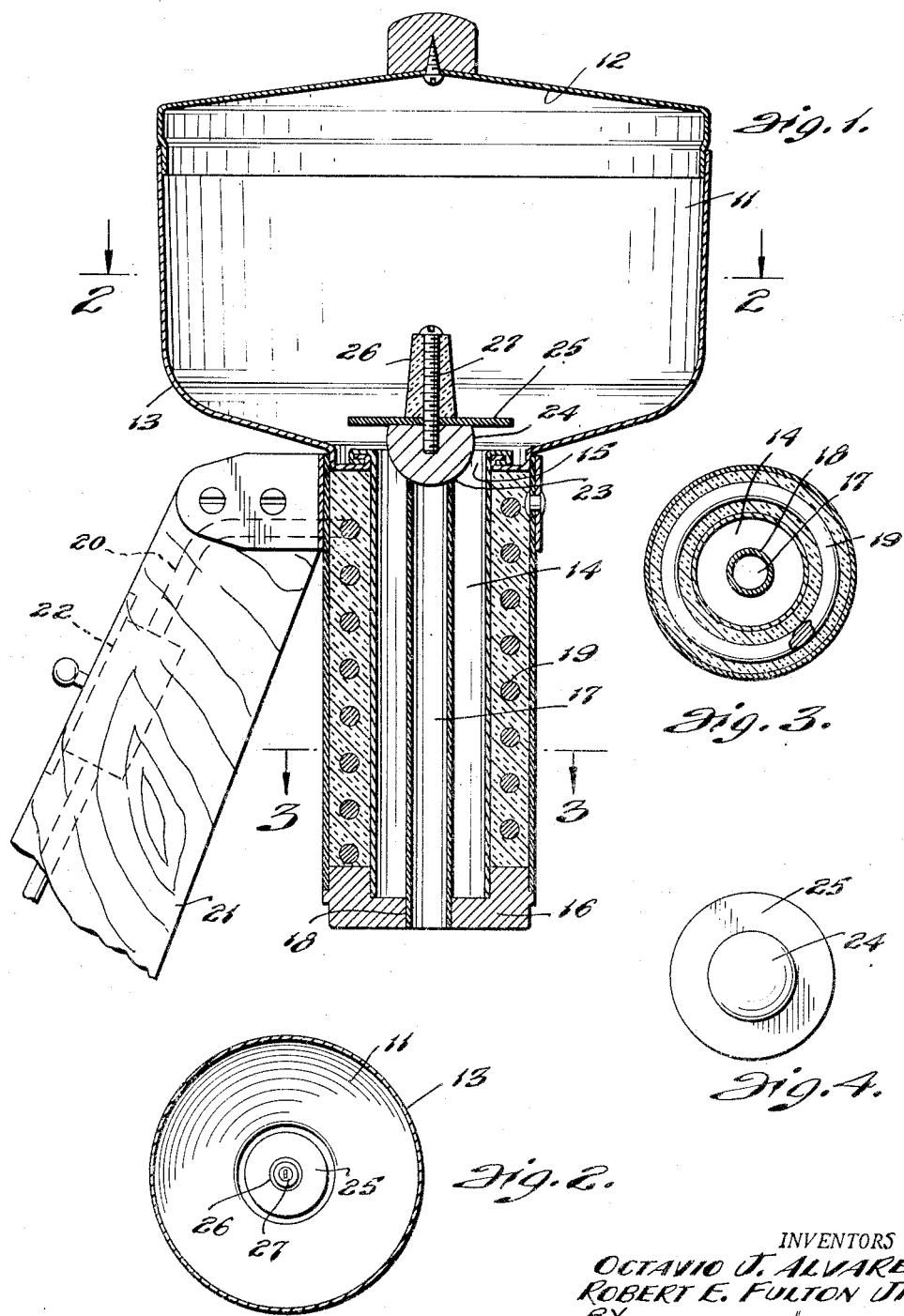
INVENTORS
OCTAVIO J. ALVAREZ
ROBERT E. FULTON JR.

Sept. 26, 1950     O. J. ALVAREZ ET AL     2,523,261
CLOSURE ARRANGEMENT FOR FLUID HEATING DEVICES
Filed Nov. 6, 1947     2 Sheets-Sheet 2

INVENTORS
OCTAVIO J. ALVAREZ
ROBERT E. FULTON JR.
BY

Patented Sept. 26, 1950

2,523,261

UNITED STATES PATENT OFFICE 2,523,261

CLOSURE ARRANGEMENT FOR FLUID HEATING DEVICES

Octavio J. Alvarez, New York, N. Y., and Robert E. Fulton, Jr., Danbury, Conn., assignors, by mesne assignments, of one-fourth to Maria De Reitzes-Marienwert, and three-fourths to Octavio J. Alvarez, both of New York, N. Y.

Application November 6, 1947, Serial No. 784,498

16 Claims. (Cl. 219—38)

Our present invention relates to devices for delivering hot fluid, and more particularly to automatic means for permitting delivery of the fluid only when it is boiling.

It is an object of our present invention to provide automatic opening and closing means for heating vessels which are arranged and constructed so as to permit passage of the heated fluid only if the same is in boiling state.

It is a further object of our present invention to provide closure means for automatically closing the outlet opening of a heating vessel when the water contained in the same ceases to boil.

Another object of our present invention consists in heating vessels constructed so that only a small portion of the water is heated at the same time, thereby obtaining delivery of boiling water within a very short time after start of operation of the heating vessel.

The novel features which we consider as characteristic for our invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational section through a heating device according to our present invention;

Fig. 2 is a horizontal section through the device shown in Fig. 1, along line 2—2 of Fig. 1;

Fig. 3 is another horizontal section through the device shown in Fig. 1, along line 3—3 of Fig. 1;

Fig. 4 is a bottom view of the combined closure and lifting member forming part of the device shown in Fig. 1, seen in direction of arrow 4;

Figure 5:
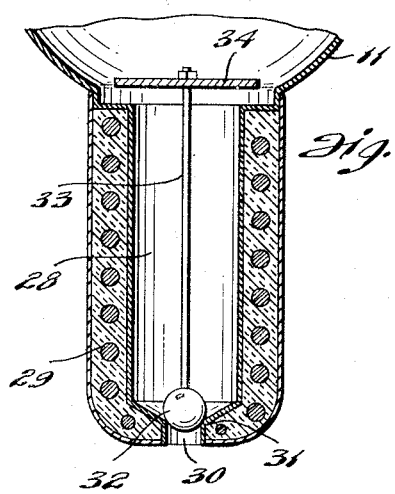
Fig. 5 is an elevational section through the heating and outlet arrangement of a device similar to the one shown in Figs. 1 to 4.

The device shown in the drawings includes a heating vessel 11 being open at its top and covered by a removable cover 12, and a combined heating and outlet arrangement secured to the bottom wall 13 of the vessel 11.

This combined heating and outlet arrangement includes a cylindrical heating tube 14 communicating at its top 15 with the interior of the heating vessel 11 and being closed at its bottom by the disc member 16. The outlet tube 17 passes through the opening 18 in the disc member 16 projecting upward, as clearly shown in Fig. 1.

The cylindrical heating tube 14 is surrounded by the cylindrical heating element 19 connected with the switch 22 by a wire 20 arranged within a bore in the handle 21.

In accordance with our present invention, we place on the valve seat formed by the upper rim 23 of the outlet tube 17 a hemispherical closure member 24 to which the circular lifting plate 25 and the additional conical closure portion 26 are secured by screw 27.

Operation of this device is as follows:

At the start of operation, the freely removable closure member 24 is placed on the upper rim 23 of the outlet tube 17, as shown in Fig. 1. Then the heating vessel 11 together with the cylindrical tube 14 are filled with water or other fluid.

Next, the switch is closed, resulting in heating of the water contained in the cylindrical heating tube 14 by the heating element 19.

The heated water in the cylindrical heating tube 14 will start to boil within a relatively short time. Such boiling will agitate the water and cause creation of air bubbles rising within the cylindrical heating tube 14 and trying to escape from the same into the heating vessel 11.

Both above causes, namely the agitated water and the air bubbles will press upward against the lifting plate 25, resulting in lifting of the same together with the closure member 24.

Such lifting of the closure member 24 will permit boiling water to escape through the outlet tube 17, reducing the upward pressure exerted by the boiling water and the air bubbles upon the lifting plate 25. This in turn will result in return of the same into its initial position with the closure member 24 in seated closing position.

Then, the water will be again agitated and air bubbles will form which will again result in lifting of the closure member.

In this manner, boiling of the water within the cylindrical heating tube 14 will result in vertical oscillating movement of the closure member 24 during which oscillations the boiling water will slowly escape through the outlet tube 17.

When the switch 22 is turned off, the heating coil 19 will cease to heat the water within the cylindrical heating tube 14, resulting in stoppage of boiling and consequent agitation of the water and formation of air bubbles. This, in turn, will result in discontinuance of oscillation of the closure member 24 which will remain seated on the rim 23 of the outlet tube 17, permanently closing the same and thus stopping the flow of water through it.

Thus, this outlet arrangement will automatically permit passage and flow of water through the outlet tube 17 only if and when the water within the cylindrical heating tube 14 is boiling, thereby ensuring that only boiling water is delivered through the outlet tube 17.

If it is desired to permanently prevent flow of boiling water through the outlet tube 17, the closure member 24 is turned upside down and inserted with its conical closure portion 26 into the upper open end of the outlet tube 17. In this position, the friction between the rim portion 23 of the tube 17 and the conical surface of the closure portion 26 prevents lifting of the entire closure member by the boiling water, keeping the outlet tube 17 permanently closed. In this condition, our new device can serve for boiling water in the heating vessel 11 itself without delivering it through the outlet tube 17.

The device shown in Fig. 5 of the drawings is similar to the one shown in Figs. 1 to 4. The main difference is that we provide only one single cylindrical outlet tube 28 surrounded by the cylindrical heating element 29. At the bottom of this outlet tube 28, we provide the outlet opening 30 having an upper rim 31 serving as seat for the ball-shaped closure member 32. This ball-shaped closure member 32 is connected by the connecting rod 33 to the flat lifting plate 34 located in the heating vessel 11 near the bottom of the same. Operation of this device is identical with operation of the device described above and shown in Figs. 1 to 4.

Figure 6:
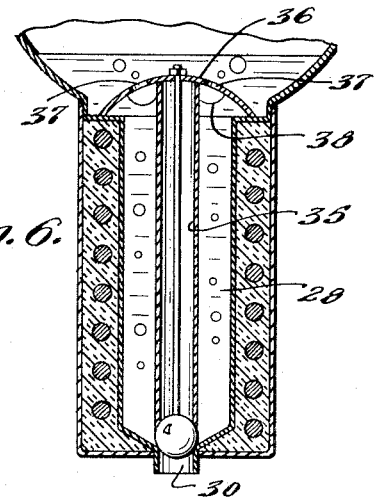
Fig. 6 is an elevational section through a heating and outlet arrangement of another device similar to the one shown in Fig. 5.

The device shown in Fig. 6 is very similar to the one shown in Fig. 5. The main difference is that instead of the relatively thin connecting rod 33, we provide a cylindrical connecting tube 35, thereby decreasing the volume of the water to be heated within the cylindrical outlet tube 28. Furthermore, in order to be able to regulate the lifting force of the lifting member secured to the connecting tube 35, we provide a cup-shaped lifting member 36 being open at its bottom. Perforations 37 are provided in this cup-shaped lifting member. By properly adjusting the size of these perforations, it is possible to cause during boiling formation of a relatively large air bubble 38 under the cup-shaped lifting member 36. The weight of this entire closure arrangement can be adjusted so that it will be lifted only if and when the air bubble 38 reaches a certain size. In this manner, it is possible to make the closure member relatively heavy, thereby ensuring safe closure of the outlet opening 30 at the bottom of the outlet conduit 28, if the water is not boiling.

Figure 7:
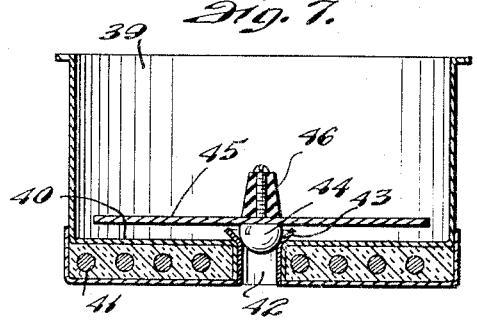
Figs. 7 to 10 are elevational sections through further modifications of the heating and outlet arrangement of the device shown in Figs. 1 to 4.

In Fig. 7, we have shown a device according to our present invention in which the heating vessel 39 has a flat bottom 40 under which the heating coils 41 are arranged. An outlet tube 42 is provided in the center of the bottom 40 and equipped with a rim-shaped valve seat 43 upon which the hemispherical closure member 44 is seated. This closure member is combined with a lifting plate 45 and an additional conical closure portion 46 of the type described above in detail.

We wish to note that this embodiment of our present invention has the additional advantage that only a relatively small quantity of fluid has to be heated at the same time, namely only the fluid which is located between the bottom 40 of the heating vessel and the lifting plate 45.

Figure 8:
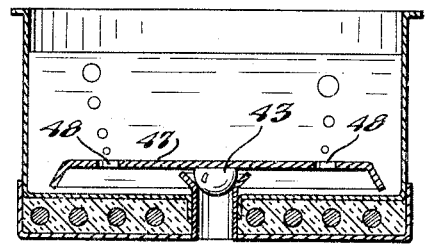

The arrangement shown in Fig. 8 is very similar to the one shown in Fig. 7. The only difference is that a cup-shaped lifting member 47 is secured to the closure member 43. This cup-shaped lifting member 47 is provided with apertures 48 of the type describe above in connection with the device shown in Fig. 6. In connection with this feature of our present invention, we wish to note that a large air bubble will be formed within the cup-shaped lifting member 36 or 47 only during boiling of the water: Before boiling of the water, there is no air but only water under the cup-shaped lifting member and after the water has ceased to boil, all air trapped within the cup-shaped lifting member will relatively quickly escape through the apertures 37 or 48. Thus, before and after boiling of the water, the entire weight of the closure member, the lifting member and the connecting member, if any, will force the closure member to be properly seated on the rim of the outlet conduit, thereby securely preventing escape of water before and after boiling of the same.

Figure 9:
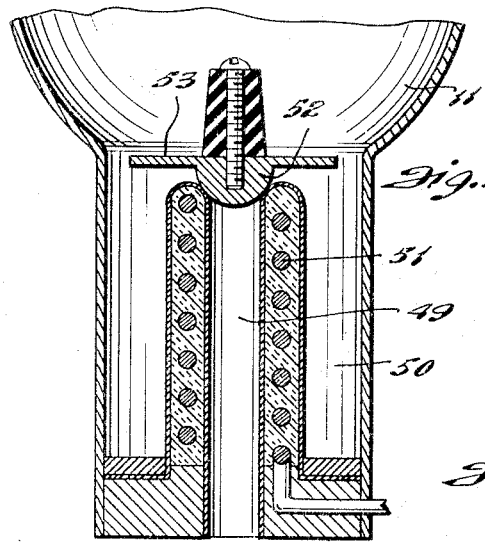

The device shown in Fig. 9 is very similar to the one shown in Figs. 5 and 7, the main difference being that the outlet conduit 49 is arranged inside a cylindrical extension 50 of the heating vessel 11. Thus, the cylindrical heating coil 51 surrounding the outlet conduit 49 heats not only the water within the annular space between the outer surface of heating coil 51 and the inner wall surface of the cylindrical extension 50, but also the boiling water passing through the outlet conduit 49. The closure member 52 and the lifting plate 53 are similar to the corresponding parts shown in Figs. 1, 2, and 4, the only difference being that they are made out of one piece.

Figure 10:
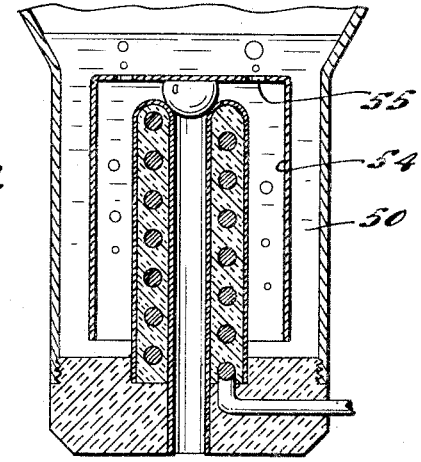

The device shown in Fig. 10 is nearly identical with the device shown in Fig. 9. The only difference is that instead of a flat lifting plate 53 we provide a cup-shaped lifting member 54 reaching far down into the cylindrical extension 50, as shown. Furthermore, we provide in this cup-shaped lifting member apertures 55 operating as described above in connection with the devices shown in Figs. 6 and 8.

It will be understood that each of the elements described above, or two or more together, may also find a useful application in other types of heating devices, differing from the types described above.

While we have illustrated and described the invention as embodied in devices for delivering boiling water, we do not intend to be limited to the details shown, since various modifications and structural changes may be made without departing in any way from the spirit of our invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What we claim as new and desire to secure by Letters Patent is:

1. Device for delivering hot fluid comprising in combination a heating vessel for said fluid; a cylindrical extension being closed at its bottom and arranged at the bottom of said heating vessel communicating with the interior of the same; an outlet tube passing through the bottom of said cylindrical extension projecting into the same and having at its upper end an upper rim; a closure member freely liftably seated on said upper rim of said outlet tube so as to close said outlet tube, when in seated position, and to permit passage of fluid therethrough, when in lifted position; a lifting member combined with said closure member and constructed so as to be adapted to be directly lifted by movement of fluid boiling in said cylindrical extension; and heating means combined with said cylindrical extension so as to be adapted to boil said fluid in the same.

2. Device for delivering hot fluid comprising in combination a heating vessel for said fluid; a cylindrical tube being closed at its bottom and arranged at the bottom of said heating vessel communicating with the interior of the same; an outlet tube passing through the bottom of said cylindrical tube projecting into the same, said outlet tube being arranged coaxially with said cylindrical tube and having at its upper end an upper rim; a closure member freely liftably seated on said upper rim of said outlet tube so as to close said outlet tube, when in seated position, and to permit passage of fluid therethrough, when in lifted position; a lifting member combined with said closure member and constructed so as to be adapted to be directly lifted by movement of fluid boiling in said cylindrical tube; and heating means combined with said cylindrical tube so as to be adapted to boil said fluid in the same.

3. Device for delivering hot fluid comprising in combination a heating vessel for said fluid having a flat bottom wall; an outlet opening in said flat bottom wall of said heating vessel having an edge portion serving as valve seat; a closure member freely liftably seated on said valve seat so as to close said outlet opening, when in seated position, and to permit passage of fluid therethrough, when in lifted position; a lifting plate secured to said closure member and constructed so as to be substantially parallel to said flat bottom wall when said closure member is seated on said valve seat and to be adapted to be directly lifted by movement of fluid boiling under it; and heating means combined with said heating vessel and arranged under the level of said lifting plate so as to be adapted to boil fluid present in the space between said flat bottom wall and said lifting plate when said closure member is seated on said valve seat.

4. Device for delivering hot fluid comprising in combination a heating vessel for said fluid having a flat bottom wall; an outlet opening in said flat bottom wall of said heating vessel having an edge portion serving as valve seat; a closure member freely liftably seated on said valve seat so as to close said outlet opening, when in seated position, and to permit passage of fluid therethrough, when in lifted position; a cup-shaped lifting plate being open at its bottom and secured to said closure member so as to face with its open bottom said flat bottom wall of said heating vessel when said closure member is seated on said valve seat and to be adapted to be directly lifted by movement of fluid boiling under it; and heating means combined with said heating vessel and arranged under the level of said lifting plate so as to be adapted to boil fluid present in the space between said flat bottom walls and said cup-shaped lifting plate when said closure is seated on said valve seat.

5. Device for delivering hot fluid comprising in combination a heating vessel for said fluid; a tubular outlet member secured at its upper end to the bottom of said heating vessel communicating with the interior of the same; an outlet opening at the bottom of said tubular outlet member having an edge portion serving as valve seat; a closure member freely liftably seated on said valve seat so as to close said outlet opening, when in seated position, and to permit passage of fluid therethrough, when in lifted position; a longitudinal connecting member secured at one end to said closure member and reaching with its other end into said heating vessel; a lifting plate secured to said other end of said connecting member so as to be adapted to be directly lifted by movement of fluid boiling under it; and heating means combined with said tubular outlet member adapted to heat the same.

6. Device for delivering hot fluid comprising in combination a heating vessel for said fluid; a tubular outlet member secured at its upper end to the bottom of said heating vessel communicating with the interior of the same; an outlet opening at the bottom of said tubular outlet member having an edge portion serving as valve seat; a closure member freely liftably seated on said valve seat so as to close said outlet opening, when in seated position, and to permit passage of fluid therethrough when in lifted position; a longitudinal connecting member secured at one end to said closure member and reaching with its other end into said heating vessel; a slightly cup-shaped lifting plate being open at its bottom and secured to said other end of said connecting member; and heating means combined with said tubular outlet member adapted to heat the same.

7. Device for delivering hot fluid comprising in combination a heating vessel for said fluid having a bottom wall; an outlet opening in said bottom wall; a double walled tubular member secured to said bottom wall of said heating vessel around said outlet opening and being open at its upper end; a heating device arranged within said double walled tubular member between the walls of the same; a closure member freely liftably seated on top of said double walled tubular member so as to close the tubular conduit formed by the same, when in seated position, and to permit passage of fluid therethrough, when in lifted position; and a cup-shaped lifting member being open at its bottom and secured at the center of its inner face to said closure member so as to form an annular space between its inner surface and the outer surface of said double walled tubular member communicating at its bottom with the interior of said heating vessel.

8. Device for delivering hot fluid comprising in combination a heating vessel for said fluid having a bottom wall; an outlet opening in said bottom wall; a double walled tubular member secured to said bottom wall of said heating vessel around said outlet opening and being open at its upper end; a heating device arranged within said double walled tubular member between the walls of the same; a closure member freely liftably seated on top of said double walled tubular member so as to close the tubular conduit formed by the same, when in seated position, and to permit passage of fluid therethrough, when in lifted position; a cup-shaped lifting member being open at its bottom and secured at the center of its inner face to said closure member so as to form an annular space between its inner surface and the outer surface of said double walled tubular member communicating at its bottom with the interior of said heating vessel; and a plurality of small openings in said cup-shaped lifting member at the top of the same.

9. A device for delivering hot fluid comprising in combination a heating vessel for said fluid; a bottom portion forming part of said heating vessel; an outlet opening in said bottom portion; a closure member freely liftably seated on said outlet opening so as to close said outlet opening when in seated position and to permit passage of fluid therethrough when in lifted position; a lifting means combined with said closure member and extending—when said closure member is seated on said outlet opening—in horizontal direction beyond the circumference of said closure member so as to form in said heating vessel a boiling space between itself and said bottom portion of said heating vessel and to be adapted to be directly lifted by movement of fluid boiling under said lifting means within said boiling space of said heating vessel; and electric heating means combined with said heating vessel for heating said bottom portion thereof so as to boil fluid within said boiling space of said heating vessel.

10. A device for delivering hot fluid comprising in combination a heating vessel for said fluid; a bottom portion forming part of said heating vessel; an outlet opening in said bottom portion; a closure member freely liftably seated on said outlet opening so as to close said outlet opening when in seated position and to permit passage of fluid therethrough when in lifted position; a lifting member secured to said closure member spaced therefrom and extending when seated on said outlet opening in horizontal direction beyond the circumference of said closure member so as to form in said heating vessel a boiling space between itself and said bottom portion of said heating vessel and to be adapted to be directly lifted by movement of fluid boiling under said lifting member within said boiling space of said heating vessel; and electric heating means combined with said heating vessel for heating said bottom portion thereof so as to boil fluid within said boiling space of said heating vessel.

11. A device for delivering hot fluid comprising in combination a heating vessel for said fluid; a bottom portion forming part of said heating vessel; an outlet opening in said bottom portion; a closure member freely liftably seated on said outlet opening so as to close said outlet opening when in seated position and to permit passage of fluid therethrough when in lifted position; a lifting plate combined with said closure member and extending—when said closure member is seated on said outlet opening—in horizontal direction beyond the circumference of said closure member so as to form in said heating vessel a boiling space between itself and said bottom portion of said heating vessel and to be adapted to be directly lifted by movement of fluid boiling under said lifting plate within said boiling space of said heating vessel; and electric heating means combined with said heating vessel for heating said bottom portion thereof so as to boil fluid within said boiling space of said heating vessel.

12. A device for delivering hot fluid comprising in combination a heating vessel for said fluid; a bottom portion forming part of said heating vessel; an outlet opening in said bottom portion; a closure member freely liftably seated on said outlet opening so as to close said outlet opening when in seated position and to permit passage of fluid therethrough when in lifted position; a lifting plate combined with said closure member and extending—when said closure member is seated on said outlet opening—in horizontal direction beyond the circumference of said closure member so as to form in said heating vessel a boiling space between itself and said bottom portion of said heating vessel and to be adapted to be directly lifted by movement of fluid boiling under said lifting plate within said boiling space of said heating vessel; a plurality of small openings in said lifting plate; and electric heating means combined with said heating vessel for heating said bottom portion thereof so as to boil fluid within said boiling space of said heating vessel.

13. A device for delivering hot fluid comprising in combination a heating vessel for said fluid; a bottom portion forming part of said heating vessel; an outlet opening in said bottom portion; a closure member having a substantially part-spherical closure face liftably seated partly within said outlet opening so as to close said outlet opening when in seated position and to permit passage of fluid therethrough when in lifted position; a lifting means combined with said closure member and extending—when said closure member is seated on said outlet opening—in horizontal direction beyond the circumference of said closure member so as to form in said heating vessel a boiling space between itself and said bottom portion of said heating vessel and to be adapted to be directly lifted by movement of fluid boiling under said lifting means within said boiling space of said heating vessel; and electric heating means combined with said heating vessel for heating said bottom portion thereof so as to boil fluid within said boiling space of said heating vessel.

14. A device for delivering hot fluid comprising in combination a heating vessel for said fluid; a bottom portion forming part of said heating vessel; an outlet opening in said bottom portion; a closure member having a top face and a substantially part-spherical closure face freely liftably seated on said outlet opening so as to close said outlet opening when in seated position and to permit passage of fluid therethrough when in lifted position; a lifting plate combined with said closure member and extending in the plane of said top face thereof—when said closure member is seated on said outlet opening—in horizontal direction beyond the circumference of said closure member so as to form in said heating vessel a boiling space between itself and said bottom portion of said heating vessel and to be adapted to be directly lifted by movement of fluid boiling under said lifting plate within said boiling space of said heating vessel; and electric heating means combined with said heating vessel for heating said bottom portion thereof so as to boil fluid within said boiling space of said heating vessel.

15. A device for delivering hot fluid comprising in combination a heating vessel for said fluid; a flat bottom wall forming part of said heating vessel; an outlet opening in said flat bottom wall; a closure member freely liftably seated on said outlet opening so as to close said outlet opening when in seated position and to permit passage of fluid therethrough when in lifted position; a lifting means combined with said closure member and extending—when said closure member is seated on said outlet opening—in horizontal direction beyond the circumference of said closure member so as to form in said heating vessel a boiling space between itself and said flat bottom wall of said heating vessel and to be adapted to be directly lifted by movement of fluid boiling under said lifting means within said boiling space of said heating vessel; and electric heating means combined with said heating vessel for heating said flat bottom wall thereof so as to boil fluid within said boiling space of said heating vessel.

16. A device for delivering hot fluid comprising in combination a heating vessel for said fluid; a flat bottom wall forming part of said heating vessel; an outlet opening in said flat bottom wall; a closure member having a top face and a substantially part-spherical closure face freely liftably seated on said outlet opening so as to close said outlet opening when in seated position and to permit passage of fluid therethrough when in lifted position; a lifting plate combined with said closure member and extending in the plane of said top face thereof—when said closure member is seated on said outlet opening—in horizontal direction beyond the circumference of said closure member so as to form in said heating vessel a boiling space between itself and said flat bottom wall of said heating vessel and to be adapted to be directly lifted by movement of fluid boiling under said lifting plate within said boiling space of said heating vessel; and electric heating means combined with said heating vessel for heating said flat bottom wall thereof so as to boil fluid within said boiling space of said heating vessel.

OCTAVIO J. ALVAREZ.
ROBERT E. FULTON, Jr.

REFERENCES CITED

The following references are of record in the file of this patent:

UNITED STATES PATENTS

| Number | Name | Date |
|---|---|---|
| 1,185,673 | Hughes | June 6, 1916 |
| 1,462,322 | Casoletti | July 17, 1923 |
| 1,481,258 | Gardiner | Jan. 22, 1924 |
| 1,916,228 | Lucia | July 4, 1933 |
| 1,927,287 | Kell et al. | Sept. 19, 1933 |
| 2,306,921 | Wilcox | Dec. 29, 1942 |

FOREIGN PATENTS

| Number | Country | Date |
|---|---|---|
| 835,095 | France | Sept. 12, 1938 |